US011644555B2

(12) United States Patent
Ding et al.

(10) Patent No.: US 11,644,555 B2
(45) Date of Patent: May 9, 2023

(54) THRESHOLD GENERATION FOR CODED ULTRASONIC SENSING

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Vaibhav Garg, Plano, TX (US); Anand Gopalan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 917 days.

(21) Appl. No.: 16/364,691

(22) Filed: Mar. 26, 2019

(65) Prior Publication Data

US 2020/0033462 A1 Jan. 30, 2020

Related U.S. Application Data

(60) Provisional application No. 62/711,014, filed on Jul. 27, 2018.

(51) Int. Cl.
*G01S 7/536* (2006.01)
*G01S 15/32* (2006.01)

(52) U.S. Cl.
CPC ............ *G01S 7/536* (2013.01); *G01S 15/325* (2013.01)

(58) Field of Classification Search
CPC ...... G01S 7/536; G01S 15/325; G01S 15/104; G01S 15/08; G01S 7/524; G01S 7/526; G01D 5/42
USPC .......................................................... 367/99
See application file for complete search history.

(56) References Cited

U.S. PATENT DOCUMENTS

| 4,287,578 | A | 9/1981 | Heyser |
| 5,961,463 | A | 10/1999 | Rhyne et al. |
| 6,113,545 | A | 9/2000 | Chiao et al. |
| 6,289,282 | B1 | 9/2001 | Hassler et al. |
| 8,668,643 | B2 | 3/2014 | Kinast |

(Continued)

FOREIGN PATENT DOCUMENTS

| CN | 103348259 B | 6/2015 |
| DE | 102008040248 A1 | 1/2010 |

(Continued)

OTHER PUBLICATIONS

CN103348259B English Machine Translation, 19 pages.

(Continued)

*Primary Examiner* — Daniel L Murphy
(74) *Attorney, Agent, or Firm* — Frank D. Cimino

(57) ABSTRACT

In an ultrasonic detection system that uses frequency-modulation coding to distinguish emitted bursts from multiple transducers, a receiver associated with a transducer uses dynamic thresholding to discriminate valid echoes from system and environmental noise in multiple envelope signals produced by multiple correlators. The time-varying dynamic thresholds are generated from the mean of noise in a respective envelope derived from the output of a respective correlator. Multiple thresholds can be combined together such that a single time-varying threshold is applied to all correlators' envelopes. Such thresholding has the benefits of a constant false-alarm rate with regard to detection of echoes (as opposed to false triggering from noise), and, owing to finer-resolution and adaptive thresholds, can detect targets or obstacles as further distances and with greater time responsiveness.

20 Claims, 8 Drawing Sheets

(56) References Cited

U.S. PATENT DOCUMENTS

| | | |
|---|---|---|
| 8,982,668 B2 | 3/2015 | Horsky et al. |
| 2002/0047780 A1 | 4/2002 | Nishimoto et al. |
| 2004/0133104 A1 | 7/2004 | Cohen-Bacrie et al. |
| 2004/0252048 A1 | 12/2004 | Hager et al. |
| 2005/0052950 A1 | 3/2005 | Klinnert et al. |
| 2005/0075568 A1 | 4/2005 | Moehring |
| 2005/0088334 A1 | 4/2005 | Herder |
| 2006/0259281 A1 | 11/2006 | Kuppuswamy et al. |
| 2008/0218324 A1 | 9/2008 | Li |
| 2011/0029044 A1 | 2/2011 | Hyde et al. |
| 2011/0267924 A1 | 11/2011 | Horsky et al. |
| 2012/0120768 A1 | 5/2012 | Horsky et al. |
| 2012/0272738 A1 | 11/2012 | Klessel et al. |
| 2013/0028053 A1 | 1/2013 | Tsuji et al. |
| 2013/0142011 A1 | 6/2013 | Hallek et al. |
| 2013/0301391 A1 | 11/2013 | Altman et al. |
| 2014/0155748 A1 | 7/2014 | Pernisa et al. |
| 2014/0219062 A1 | 8/2014 | Rothberg et al. |
| 2014/0331772 A1 | 11/2014 | Klotz et al. |
| 2015/0253123 A1 | 9/2015 | Braker et al. |
| 2015/0323667 A1 | 11/2015 | Przybyla et al. |
| 2016/0044394 A1 | 2/2016 | Derom |
| 2016/0161604 A1 | 6/2016 | Clark |
| 2016/0209493 A1 | 7/2016 | Krasner |
| 2016/0217686 A1 | 7/2016 | Lee |
| 2017/0003391 A1 | 1/2017 | Hallek et al. |
| 2017/0363724 A1 | 12/2017 | Reid |
| 2018/0017671 A1 | 1/2018 | Warke et al. |
| 2018/0203095 A1 | 7/2018 | Xie et al. |
| 2018/0252803 A1 | 9/2018 | Bilik et al. |
| 2019/0025415 A1 | 1/2019 | Suchy et al. |
| 2019/0339385 A1 | 11/2019 | Nakamizo et al. |
| 2019/0339386 A1 | 11/2019 | Ding et al. |
| 2020/0033462 A1 | 1/2020 | Ding et al. |
| 2020/0309945 A1 | 10/2020 | Ding et al. |
| 2020/0400820 A1 | 12/2020 | Nauen |
| 2021/0156995 A1 | 5/2021 | Ding et al. |
| 2021/0302548 A1 | 9/2021 | Chen et al. |

FOREIGN PATENT DOCUMENTS

| | | |
|---|---|---|
| DE | 102011079706 A1 | 1/2013 |
| DE | 102012211293 A1 | 1/2014 |
| DE | 102012017367 A1 | 3/2014 |
| DE | 102012015967 A1 | 5/2014 |
| DE | 102013008235 A1 | 11/2014 |
| DE | 102013022273 A1 | 11/2014 |
| DE | 102013019431 A1 | 5/2015 |
| DE | 102013021845 A1 | 6/2015 |
| DE | 102017123052 B3 | 2/2018 |
| DE | 102018106244 B3 | 6/2019 |
| DE | 102018010254 A1 | 9/2019 |
| DE | 102018010255 A1 | 9/2019 |
| DE | 102018010257 A1 | 9/2019 |
| DE | 102018010258 A1 | 9/2019 |
| DE | 102018010260 A1 | 9/2019 |
| DE | 102018010261 A1 | 9/2019 |
| DE | 102018106251 A1 | 9/2019 |
| DE | 102019105651 A1 | 9/2019 |
| DE | 102019106190 A1 | 9/2019 |
| DE | 1020184106247 A1 | 9/2019 |
| DE | 1020191106432 A1 | 9/2019 |
| DE | 102018206649 A1 | 10/2019 |
| DE | 102017104145 A1 | 11/2019 |
| EP | 2737857 A1 | 6/2014 |
| FR | 2815128 A1 | 4/2002 |
| GB | 2534034 A | 7/2016 |
| GB | 2539798 A | 12/2016 |
| GB | 2548461 A | 9/2017 |
| JP | 2627745 B2 | 7/1997 |
| KR | 20160098362 A | 8/2016 |
| WO | 2012016834 A1 | 2/2012 |
| WO | 2012016841 A1 | 2/2012 |
| WO | 2012151869 A1 | 11/2012 |
| WO | 2014180609 A1 | 11/2014 |
| WO | 2015039805 A1 | 3/2015 |
| WO | 2015090842 A1 | 6/2015 |
| WO | 2016166763 A2 | 10/2016 |
| WO | 2018210966 A1 | 11/2018 |
| WO | 2019217306 A1 | 11/2019 |

OTHER PUBLICATIONS

KR20160098362A English Machine Translation, 11 pages.
Cross Referenced from U.S. Appl. No. 16/364,652. Office Action dated Nov. 29, 2021, pp. 1-45.
International Search Report for PCT/US2019/030895, date of mailing of international search report dated Aug. 22, 2019, 2 pages.
Supplementary European Search Report dated Jan. 14, 2022, EP application No. 19906212, 9 pages.
IEEE Article, Giannakis et al, Space-time-doppler coding over time-selective fading channels with maximum diversity and coding gains:, 2002, 4 pages.
Cross reference from U.S. Appl. No. 16/364,652, Non-Final Office Action, dated Nov. 29, 2021.
Cross Reference from U.S. Appl. No. 16/426,779, Office Action dated Aug. 31, 2021.
Rubio, M. Carmen Perez, et al. "Correlator Implementation for orthogonal CSS used in an ultrasonic LPS." IEEE Sensors Journal 12.9 (2012): 2807-2816. (Year 2012).
PCT International Search Report for PCT/US19/68037, dated Apr. 16, 2020, 2 pages.

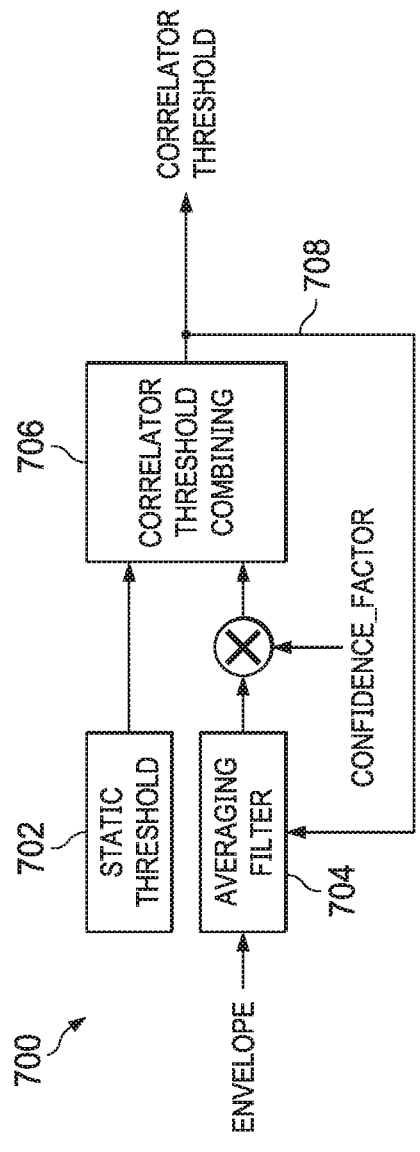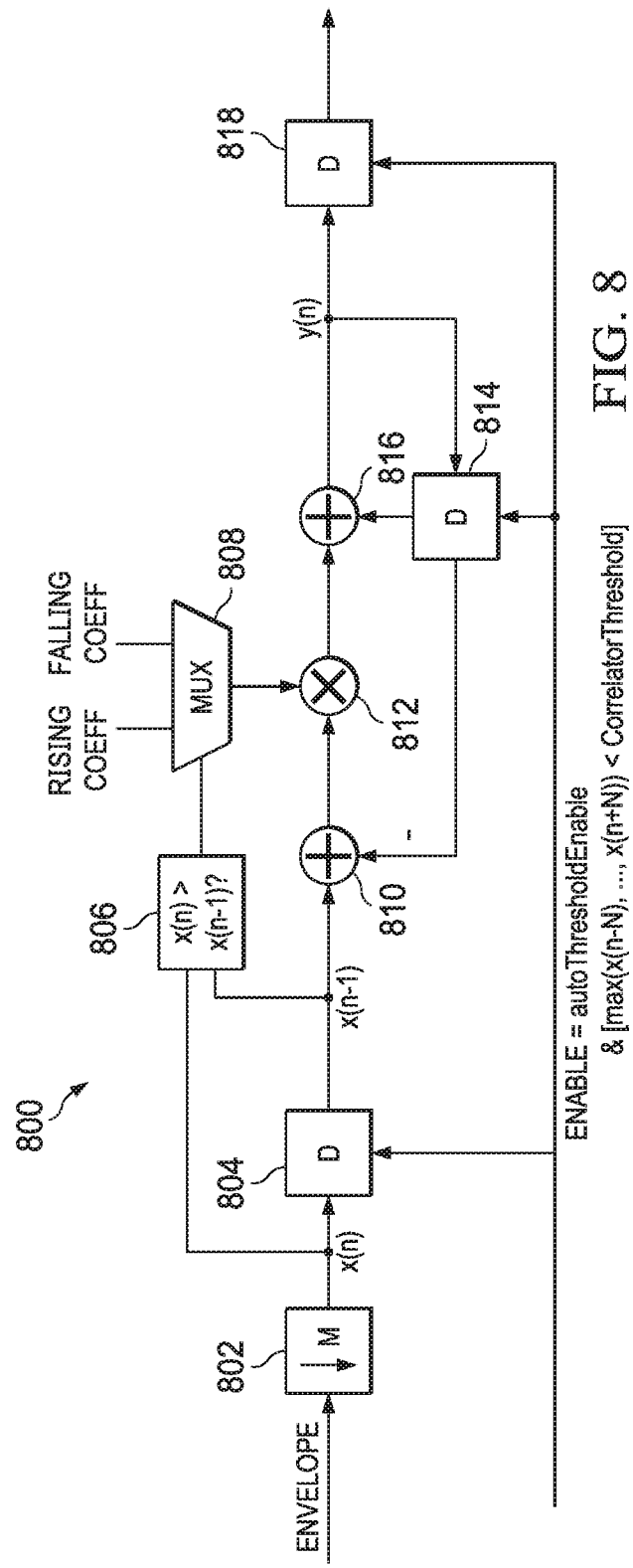

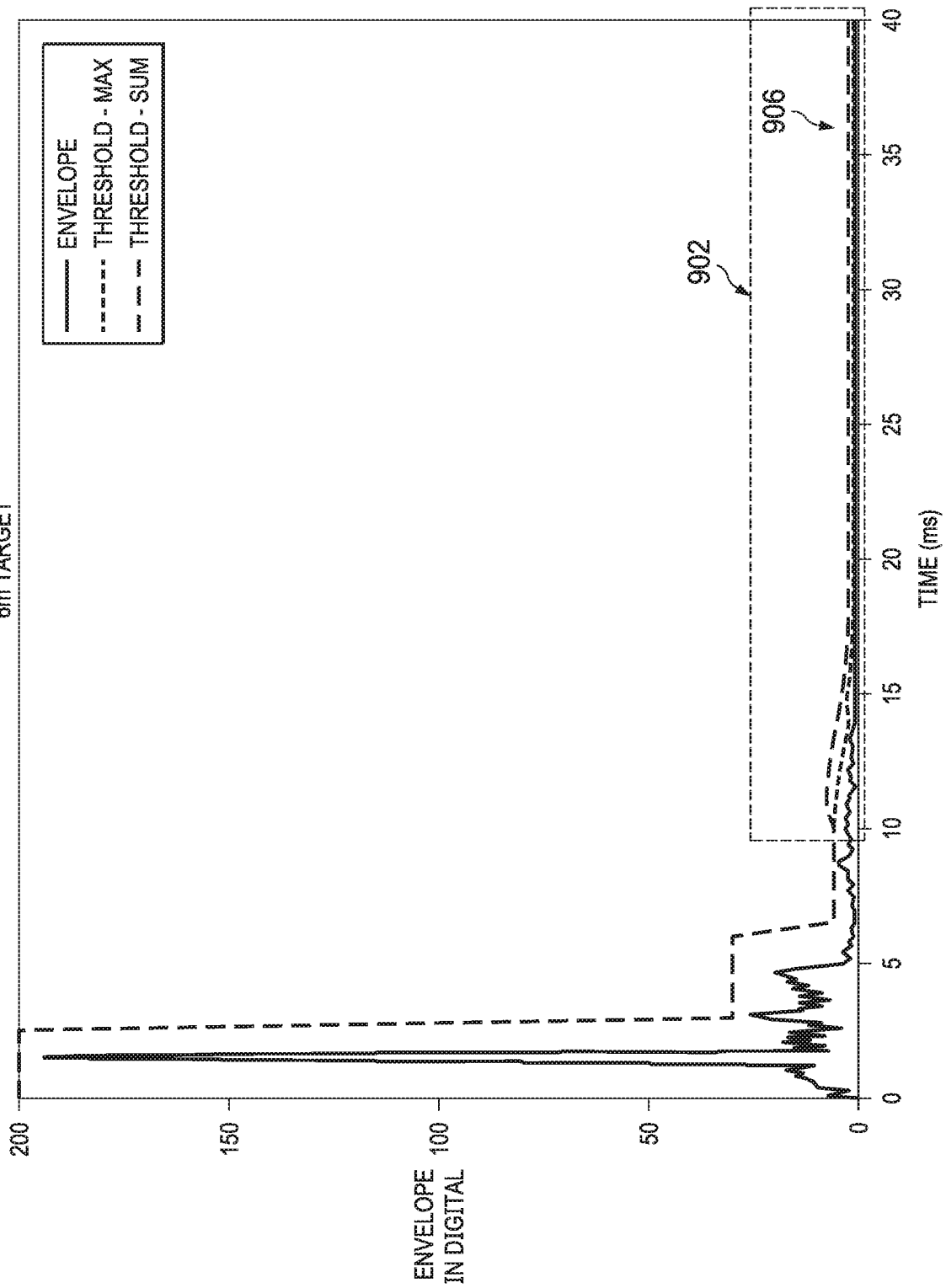

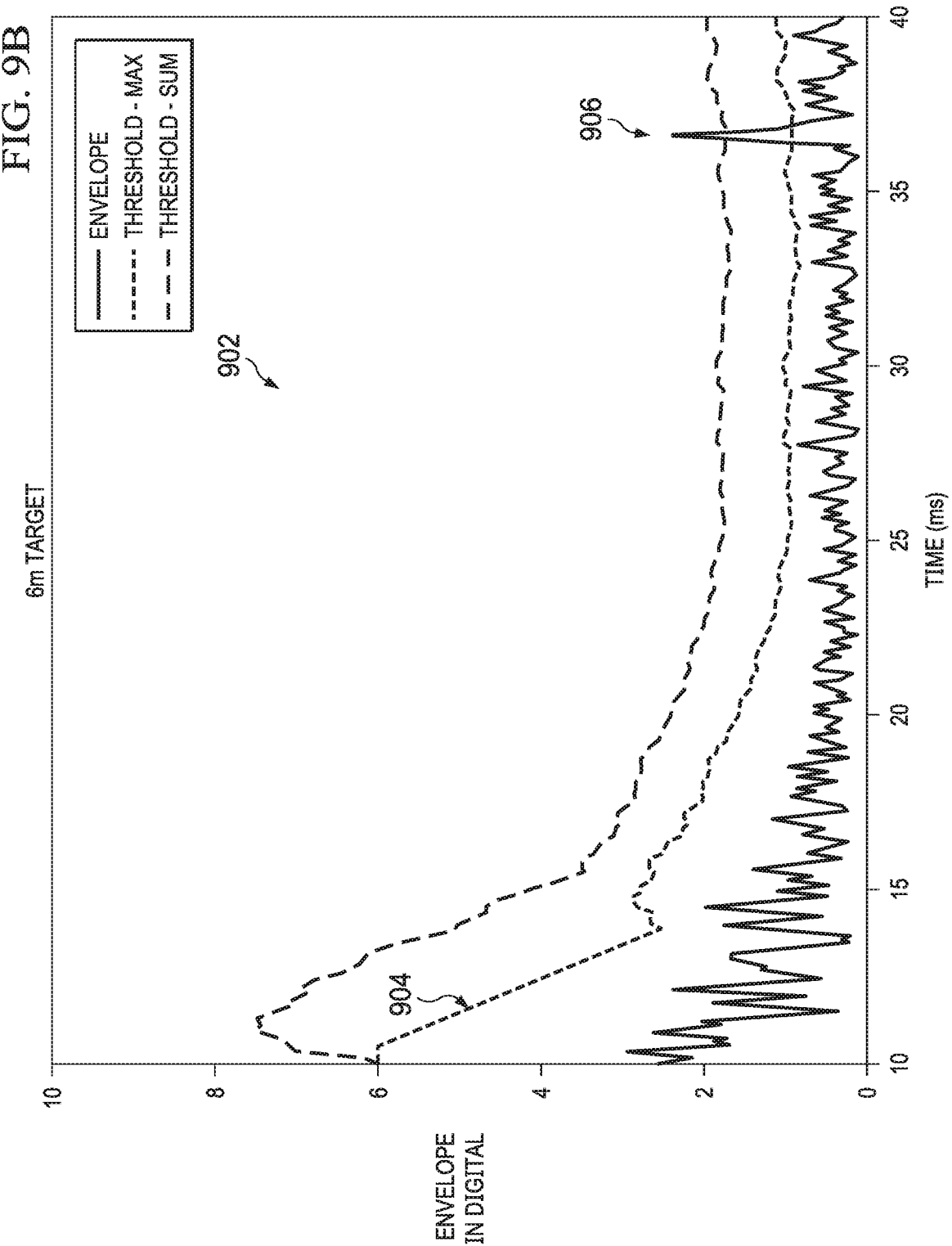

THRESHOLD GENERATION FOR CODED ULTRASONIC SENSING

CROSS-REFERENCE TO RELATED APPLICATION

This application claims priority to U.S. provisional patent application No. 62/711,014, filed in the U.S. Patent and Trademark Office on 27 Jul. 2018. The provisional patent application is herein incorporated by reference.

TECHNICAL FIELD

This disclosure relates to electronic processing systems and methods, particularly for threshold generation for coded ultrasonic sensing.

BACKGROUND

Ultrasonic ranging is used in a variety of applications. For example, in an automotive application, ultrasonic transducers can be arranged in a bumper or fender of an automobile. The transducers emit ultrasonic signals that reflect off nearby objects, if present, and sense the reflections. The round-trip time of the ultrasonic signals is measured so that distance to the object can be determined or, by processing reflection information from multiple transducers, the position of the object can be deduced. Collision avoidance can thereby be achieved, e.g., by presenting such determined or deduced information, or navigation information based thereon, to a warning system configured to present a warning signal to a human driver, or to an automated driving system configured to navigate a vehicle to avoid collisions with detected obstacles.

SUMMARY

An example ultrasonic sensing system includes burst generation circuitry and a receiver signal path. The burst generation circuitry generates a frequency-modulation-coded burst signal including a sequence of pulses of variable time duration. The ultrasonic transducer emits the burst signal and transduces a reflected acoustic signal. The receiver signal path includes first and second correlators each coupled to a respective threshold generation stage, which is, in turn coupled to a respective threshold compare stage. The correlators each correlate a received signal, sampled from the transduced reflected acoustic signal, with a respective transmission template characterizing a frequency-modulation code of the generated burst signal. The threshold generation stages each generate a mean of noise in a respective envelope derived from the output of the respective correlator, and dynamically generate a threshold based on the envelope noise mean. The threshold compare stages each threshold the respective envelope based on one or more of the dynamically generated thresholds. The receiver signal path is configured to compute location and amplitude of one or more peaks in the respective envelopes indicative of one or more distances between the transducer and one or more detected objects.

In another example, a method of ultrasonic detection adaptive thresholding includes correlating a received signal, sampled from a transduced reflected acoustic signal, with a transmission template characterizing a frequency-modulation code of a generated burst signal to produce a correlated received signal. A mean of noise in an envelope derived from the correlated received signal is then generated. A threshold based on the envelope noise mean is then dynamically generated. The envelope is then thresholded based the dynamically generated threshold.

In yet another example, an ultrasonic sensing system includes burst generation circuitry and a receiver signal path. The burst generation circuitry generates a frequency-modulation-coded burst signal including a sequence of pulses of variable time duration. The ultrasonic transducer emits the burst signal and transduces a reflected acoustic signal. The receiver signal path includes a time-varying gain (TVG) amplifier, an analog-to-digital converter (ADC), first and second correlators each coupled to a respective threshold generation stage, which is in turn coupled to a respective threshold compare stage, which is in turn coupled to a respective peak search stage, which is in turn coupled to a respective peak buffer. The TVG amplifier amplifies the transduced reflected acoustic signal. The ADC samples the amplified signal from the TGV amplifier. The correlators each correlate a received signal based on the sampled signal from the ADC with a respective transmission template characterizing a frequency-modulation code of the generated burst signal. The threshold generation stages each generate a mean of noise in a respective envelope derived from the output of the respective correlator, and dynamically generate a threshold based on the envelope noise mean. The threshold compare stages each threshold the respective envelope based on one or more of the dynamically generated thresholds. The peak search stages each detect one or more peaks by determining the respective locations and amplitudes of peaks in the respective thresholded envelope. The peak buffers each store the one or more peaks detected by the corresponding peak search stage by the amplitude and location of each one or more detected peak. The receiver signal path further includes a peak rank stage that compares the peaks stored in the peak buffers and thereby designates each of the peaks as either valid or invalid. The receiver signal path is configured to compute location and amplitude of one or more peaks in the respective envelopes indicative of one or more distances between the transducer and one or more detected objects.

BRIEF DESCRIPTION OF THE DRAWINGS

FIG. 7 is a block diagram of an example threshold generation stage used in a received signal processing path in an ultrasonic transducer controller.

FIG. 8 is a block diagram of an example averaging filter for use in a threshold generation stage in a received signal processing path in an ultrasonic transducer controller.

FIGS. 9A-9B are graphs of example dynamic thresholds plotted with an example envelope.

DETAILED DESCRIPTION

Reflected ultrasonic signals can be detected by an ultrasonic transducer and used to measure round-trip time to thereby determine distance to an object that reflected the ultrasonic signals. For example, automotive applications can use one or more ultrasonic sensors to sense the distances of objects behind, along, or in front of a car. This application discloses systems and methods providing enhanced ultrasonic detection of obstacles, particularly when multiple ultrasonic transducers operate concurrently. Discrimination of echoes of ultrasonic signals produced by different transducers is improved by coding emitted signal bursts and processing received echoes with knowledge of such coding information.

Allowing concurrent operation of multiple transducers greatly improves the speed of the detection system and thereby also the responsiveness of the associated driver-warning or automated driving control system. The coding of the signal bursts from different transducers improves reflection detection by distinguishing the main peak in envelopes of correlated reflected signals, which main peaks correspond to true reflections, from peaks (main or subsidiary) corresponding to echoes sensed from other transducers. The present systems and methods use peak search, peak buffer, and peak rank logic to identify valid peaks in correlator outputs. The peak rank logic supports different modes, which are designed to handle one burst code, two or more burst codes, or two or more burst codes with Doppler detection. Validated peak information (e.g., amplitude and time) can be reported to a central controller and/or stored locally in fusion logic to generate more intelligent information about possible targets or obstacles using peaks from multiple bursts.

Figure 1:
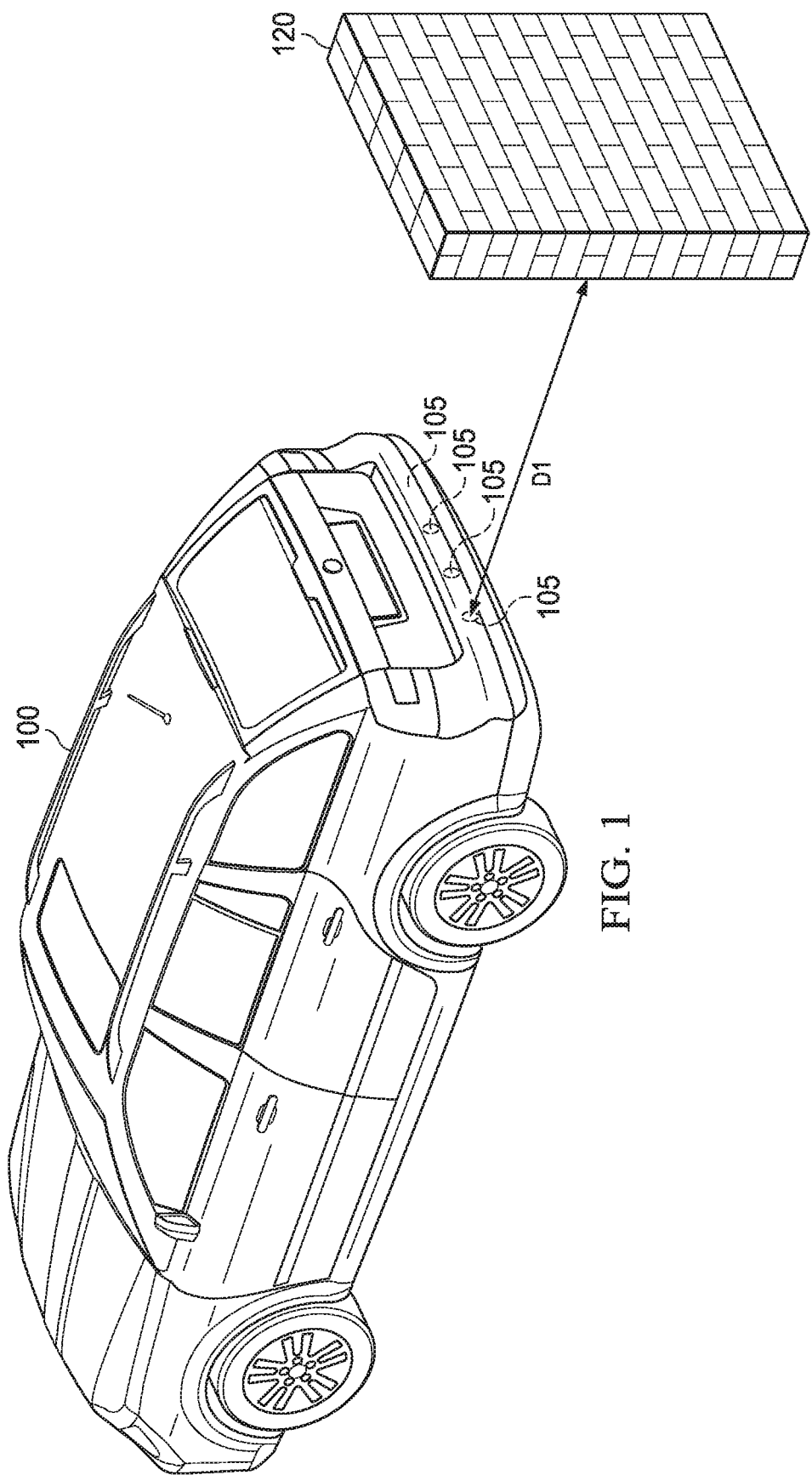
FIG. 1 illustrates an automobile with ultrasonic transducers to measure distance to an object.

FIG. 1 illustrates the use of a distance measuring (i.e., ranging) system based on ultrasound, namely, in an automobile 100 that includes one or more ultrasonic transducers 105 in the front and/or rear bumpers. In the example of FIG. 1, four ultrasonic transducers 105 are shown, but the number of transducers in each bumper can be other than four in other examples. As used herein, "transducers" refers to ultrasonic transducers. Any single transducer can function both to emit ultrasonic signals, transducing electrical signals into acoustical signals, and to sense reflected signals, transducing acoustical signals into electric signals. Each transducer 105 can, for example, emit sound waves and then can detect a reflection of the emitted sound waves after they have bounced off an object (e.g., object 120) and returned to the transducer. The elapsed time t between when the sound is first emitted from the transducer and when the reflected sound wave is detected back at the transducer can be measured by receiver circuitry coupled to the transducer. The total round-trip distance is the product of the speed of sound through air c (about 344 meters per second or 1,129 feet per second) and the measured time t. The distance D1 between the transducer and an object is then given by the formula $D1=ct/2$, where the division by two accounts for the fact that the reflected sound waves make a round trip back to the transducer.

In some examples, the sound wave signals are emitted as short bursts of sound at a specific frequency, typically above 20 kHz, e.g., at about 50 kHz. The emitted sound waves typically comprise a number of pulses, e.g., between about fifteen and one hundred pulses, e.g., between about twenty and sixty-five pulses. A controller (not shown in FIG. 1), which can, for example, be implemented as an integrated circuit (IC) associated with and packaged with a single transducer 105, can drive the transducer 105 with an electrical driving signal. The transducer 105 can then convert the electrical driving signal into an acoustic sound wave going out of the transducer. A controller directing its associated transducer to emit a burst will herein be referred to as "bursting" the transducer. The transducer 105 converts a received reflected sound wave into an electrical signal and passes the transduced signal to a receiver in the controller configured to process the received signal. Internal to the controller is a timer that is started upon emission of the burst sequence, and, upon receipt of a valid echo, the value of the timer is recorded as the time-of-flight (ToF) of the echo. As noted above, this time-of-flight, divided by two and multiplied by the speed of sound in air, gives the distance between the transducer 105 and the reflecting object 120.

In some implementations, the transducers 105 all emit the same frequency (e.g., 50 kHz) but do so in sequential fashion, that is, one transducer 105 emits a sound signal and waits for a predetermined period of time for a reflection before the next transducer 105 is permitted to emit its sound signal. Without waiting, it can be ambiguous which transducer emitted the signal echoed, which in turn can diminish the accuracy of the determination of the position or distance of the reflecting object. Such waiting means that for an example maximum object detection range of five meters, about forty milliseconds must elapse between sequential bursts of different transducers, which means that a single scan of a typical complement of four sensors takes one hundred sixty milliseconds. This length of time may be unacceptably long in time-critical applications such as those involving collision detection and warning.

By contrast to the single-tone implementations described above, the systems and methods described herein use coded-waveform burst signals, e.g., to distinguish between the burst signals of different transducers and thereby to reduce or eliminate the time needed between bursting of different transducers. Rather than using a single-tone burst signal, a frequency-modulated signal can be emitted by any one transducer, permitting, for example, disambiguation of return echoes resulting from multiple transducers.

In examples that use such frequency-modulation coding, each burst can consist, for example, of a pulse sequence resembling a square wave, but with each pulse in the waveform having a different duration corresponding to a different frequency. In some examples, the frequencies used to generate a given sound burst may range between a first frequency and second frequency and thus have a difference referred to as $\Delta f$. As an example, a first pulse in a burst can have a duration corresponding to a frequency of 48.0 kHz, a second pulse in the burst can have a duration corresponding to a frequency of 48.2 kHz, a third pulse in the burst can have a duration corresponding to a frequency of 48.4 kHz, and so on, until the twenty-first and last pulse in the burst, which can have a duration corresponding to a frequency of 52.0 kHz. The preceding represents but one example; other pulse frequencies and number of pulses per burst are also possible, as are arrangements of different-frequency pulses within the burst, beyond sequential frequency increase, as in this example, or, in other examples, frequency decrease, or frequency increase-then-decrease, or frequency decrease-then-increase.

Thus, in other examples, a burst can sweep up from a first frequency to a second, higher frequency and back down again to the first frequency or to a third frequency that is lower than the second frequency. In still other examples, the burst can sweep down from a first frequency to a second, lower frequency and then back up to the first frequency or to a third frequency that is higher than the second frequency. Other modulation patterns are possible as well. Whatever the pattern, the particular sweep characteristics of the burst, in terms of pulse frequencies, number of pulses, time duration of pulses, and/or time-arrangement of pulses (e.g., by frequency, duration or otherwise) can act as a burst signature that is identifying of the transducer emitting the burst. Each transducer can have its own unique frequency modulation signature in the coded burst waveform it emits. Thanks at least in part to the above-described burst coding, no restriction need be placed on the overlapping of the frequency ranges of the sweep(s) in bursts from different transducers.

As described in greater detail below, receiver circuitry in the controller associated with a particular transducer can be equipped with a correlator. The correlator can be provided with a template that is sampled from a coded signal used to create the driving signal. Each transducer thereby correlates only to its own template. Specifically, because each transducer has a distinct frequency modulation pattern, each transducer's receiver circuitry is able to correlate a received signal only to that transducer's own frequency modulation signature. Owing to the distinctness of the different transducers' bursts, the bursts can temporally overlap, e.g., all of the transducers 105 can emit their sound signals concurrently or simultaneously. As each emitted sound signal is uniquely coded for a specific transducer 105, the reflected sound signals are unique as well and can be differentiated by the receiver circuitry connected to each transducer.

Figure 2:
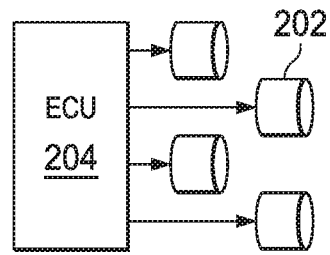
FIG. 2 is a high-level diagram showing the organization between a central controller and a number of ultrasonic sensor units each having a controller.

FIG. 2 shows the organization of a plurality of ultrasonic sensor modules 202 as directed by a central controller 204, e.g., an electronic control unit (ECU). Each sensor module 202 can comprise an associated individual controller (not specifically shown), which can be implemented, for example, as an integrated circuit (IC), and which is configured to drive an ultrasonic transducer (not specifically shown) in the sensor module 202 as well as to process a received signal that may contain echoes corresponding to targets or obstacles. After processing, the transducer-associated controller can send the processed echo information back to the central controller 204, which can collect processed echo information from multiple transducers (e.g., all four transducers, in the illustrated example) and triangulate the detected object based on the collected information from the multiple transducers. Central controller 204 can also perform some additional high-level processing, including processing to handle interference. An individual transducer-associated controller (not specifically shown, but within sensor module 202) can have a plurality of configuration registers for storing configuration variables provided to it by central controller 204. Central controller 204, can, for example, program an individual transducer-associated controller with a static threshold map (a series of time/value pairs, as illustrated in FIG. 5) through a communication interface.

Figure 3:
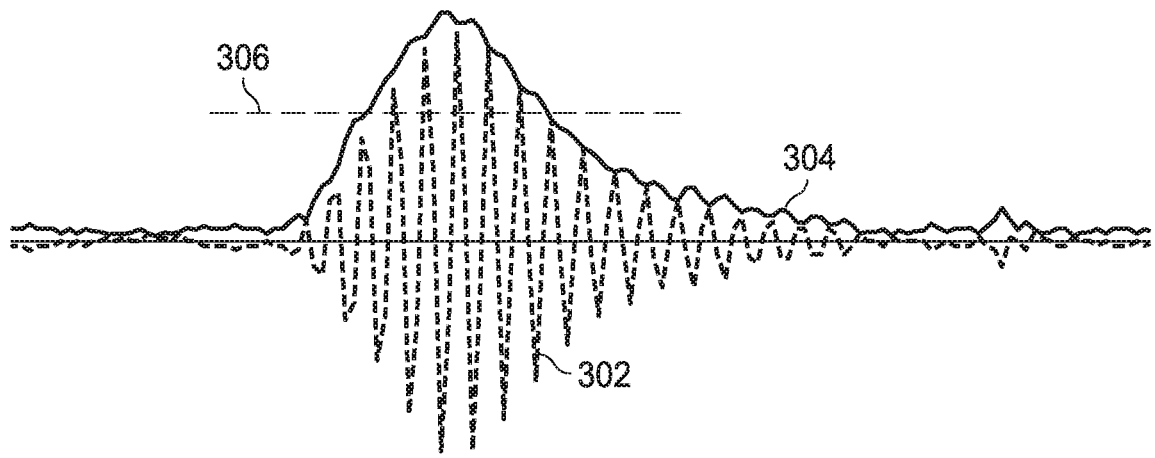
FIG. 3 is a graph of an example envelope of a sensed ultrasonic reflection.

FIG. 3 shows an example of a received echo signal 302 and its envelope 304. The echo signal 302 can be received as an acoustic signal by an ultrasonic transducer and converted into an electrical signal, which can be amplified and sampled by an analog-to-digital converter in the individual controller associated with the transducer. The individual controller can then generate the envelope 304 from the sampled received signal 302. The individual controller can further be configured to compare the envelope to a threshold 306. An envelope exceeding the threshold can be declared a valid echo corresponding to a detected target or obstacle (as opposed to merely being noise, for example, whether acoustic environmental noise or electrical noise inherent in the receiver signal path), and a time-of-flight can be computed based on the time elapsed between burst emission and echo receipt.

Figure 4:
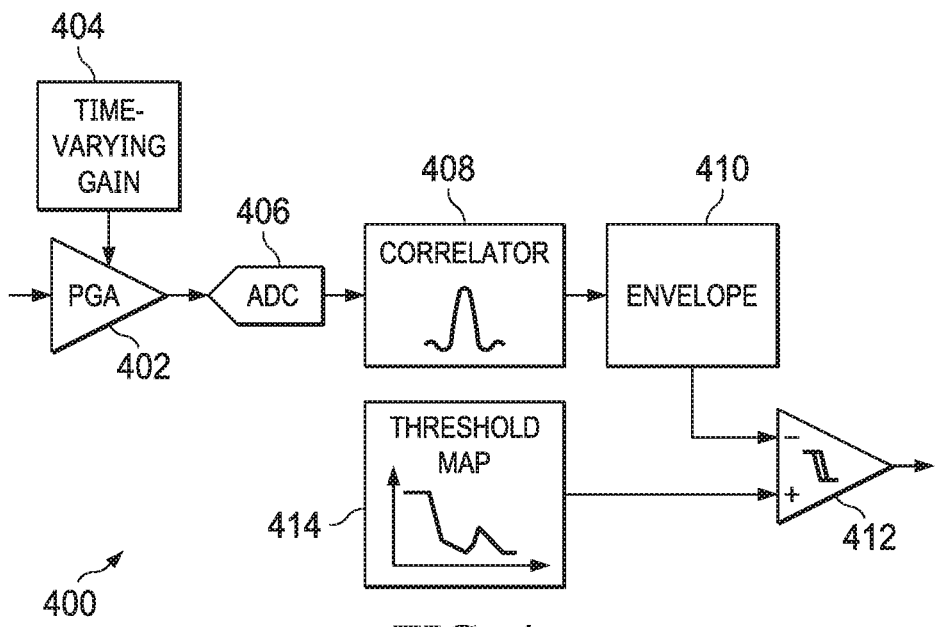
FIG. 4 is a block diagram of an example portion of a received signal processing path in an ultrasonic transducer controller.

The threshold 306 illustrated in FIG. 3 need not be a single-value static threshold. In some examples, the threshold can vary with respect to time, e.g., starting from the time of burst emission. FIG. 4 shows an example receiver signal path 400 that can be used in an individual controller associated with a transducer in a sensor module 202, which makes use of a time-varying threshold map 414. An analog electrical signal transduced by an ultrasonic transducer from a received acoustic signal can be amplified by a programmable gain amplifier 402, which can receive a time-varying gain input 404. The amplified transduced received signal can then be sampled by an analog-to-digital converter (ADC) 406. The ADC output can then go to a correlator 408. In examples that do not use coded bursts, this stage can be a simple bandpass filter. In examples that use coded bursts, this stage can apply a correlation function between the sampled received signal provided by ADC 406 and a transmission (TX) template that supplies information about the code used by the emitted burst. Resultantly, the output provided to envelope stage 410 corresponds to the coded burst emitted by the transducer with which receiver path is associated, and not to a differently coded burst emitted by a different transducer. In the envelope stage 410, an envelope of the correlated signal is generated. As an example, a rectifier, a peak hold stage, and a low pass filter can be used to reconstruct the envelope of the correlated signal. This envelope is then compared, using comparator 412, with threshold map 414, to either declare the envelope as signifying a valid echo from an object or not. Having passed the threshold and the reflecting object thereby having been declared a valid object, the time-of-flight can then be recorded, which information can be sent back to a central controller 204 (e.g., ECU).

Figure 5:
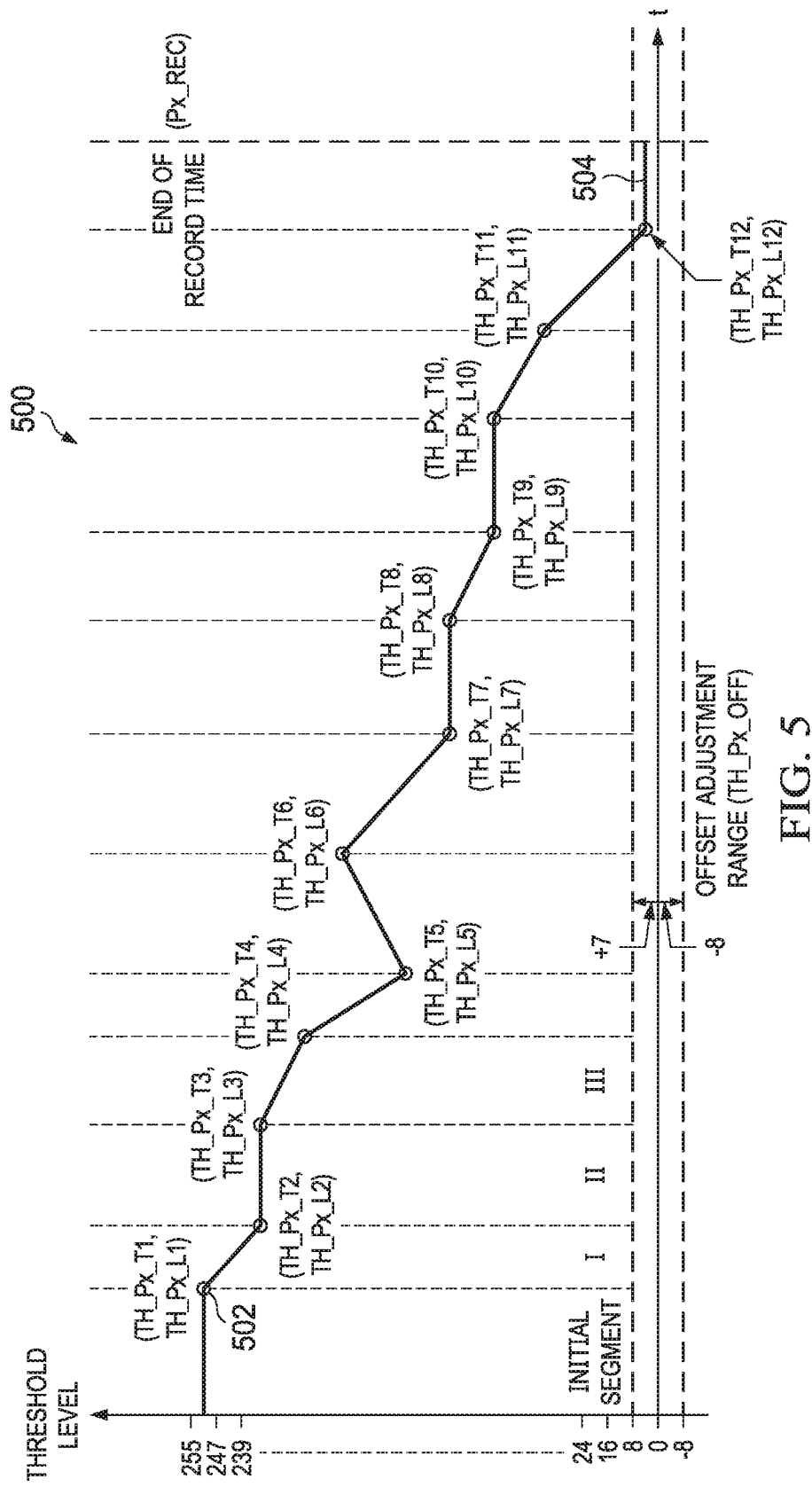
FIG. 5 is graph of an example static threshold map consisting of linearly interpolated time/value pairs.

FIG. 5 shows an example threshold map 500, which is defined by a set of points of time/value pairs. The times and values can be set by a user, e.g., a systems integrator implementing the ultrasonic detection system in a detection application, such as an automotive application. The beginning of the threshold map 500 corresponds to a time with relation to the emission of the corresponding burst, e.g., the time of emission or some predefined delay period afterward. In the illustrated example, the threshold level values are of 8-bit resolution, resulting in a vertical axis on a scale from 0 to 255. The threshold map may be limited to a 255-level amplitude resolution, for example, because the threshold settings are set by an EEPROM which limits its resolution and the number of points in time, and because any increase in resolution or time incurs a hardware cost from additional EEPROM storage in the ultrasonic detection device.

The first time/value pair point in threshold map 500, labeled 502, is at a specific time and a value of about 250. For segments of the threshold map 500 between defined points, e.g., regions I, II, III, etc., the threshold map 500 can be interpolated (e.g., linearly interpolated) between points to provide map values for any arbitrary time instance. The initial segment of the threshold map can be constant at the value of the first point 502. If the echo envelope amplitude is above the threshold level, it is determined to be a valid echo. The threshold is set to be above a noise level, and, in some examples, to avoid validation of reflection peaks resulting from certain types of target at particular distances, e.g., a ground reflection. Thus, for some examples, the threshold can be set higher to avoid triggering by ground reflections. The end of the threshold map, i.e., the final threshold 504, corresponds to the end of the record time for the received ultrasonic signal and thus to sensor range, i.e., the furthest distance from which a valid reflection is detected.

Threshold map 500 varies with respect to time, but it is static in that the values at each time are pre-set and are not adapted to the circumstances of the application of the threshold to a processed received signal. Use of a static threshold map as in FIG. 5 presents several disadvantages. First, although one purpose of the thresholding is to protect against false positive echo detections resulting from system electrical noise and environmental acoustic noise, the noise level may vary depending on the transducer and receiver devices used and the environment being operated in. Second, end-of-range thresholds set high enough to accommodate a wide variety of noise floors of different transducer and receiver devices and different environments can mask smaller end-of-range echoes.

Systems and method described herein therefore can dynamically set thresholds based on the noise level in the receive signal by calculating the noise average in the received signal and setting a threshold based on the calculated noise average. Dynamically setting the noise threshold in this manner results in a constant false alarm rate that depends on a scaling factor (herein termed Confidence_Factor) used as a multiplier of a noise average. Dynamically setting the noise threshold in this manner also results as a finer threshold resolution, because internally the threshold values can be represented at greater resolution than the amplitude EEPROM-determined resolution of the threshold map (e.g., 8-bit, i.e., 255-level, as shown in the example of FIG. 5). For example, internally, threshold levels can be represented at 16-bit, rather than 8-bit.

Figure 6:
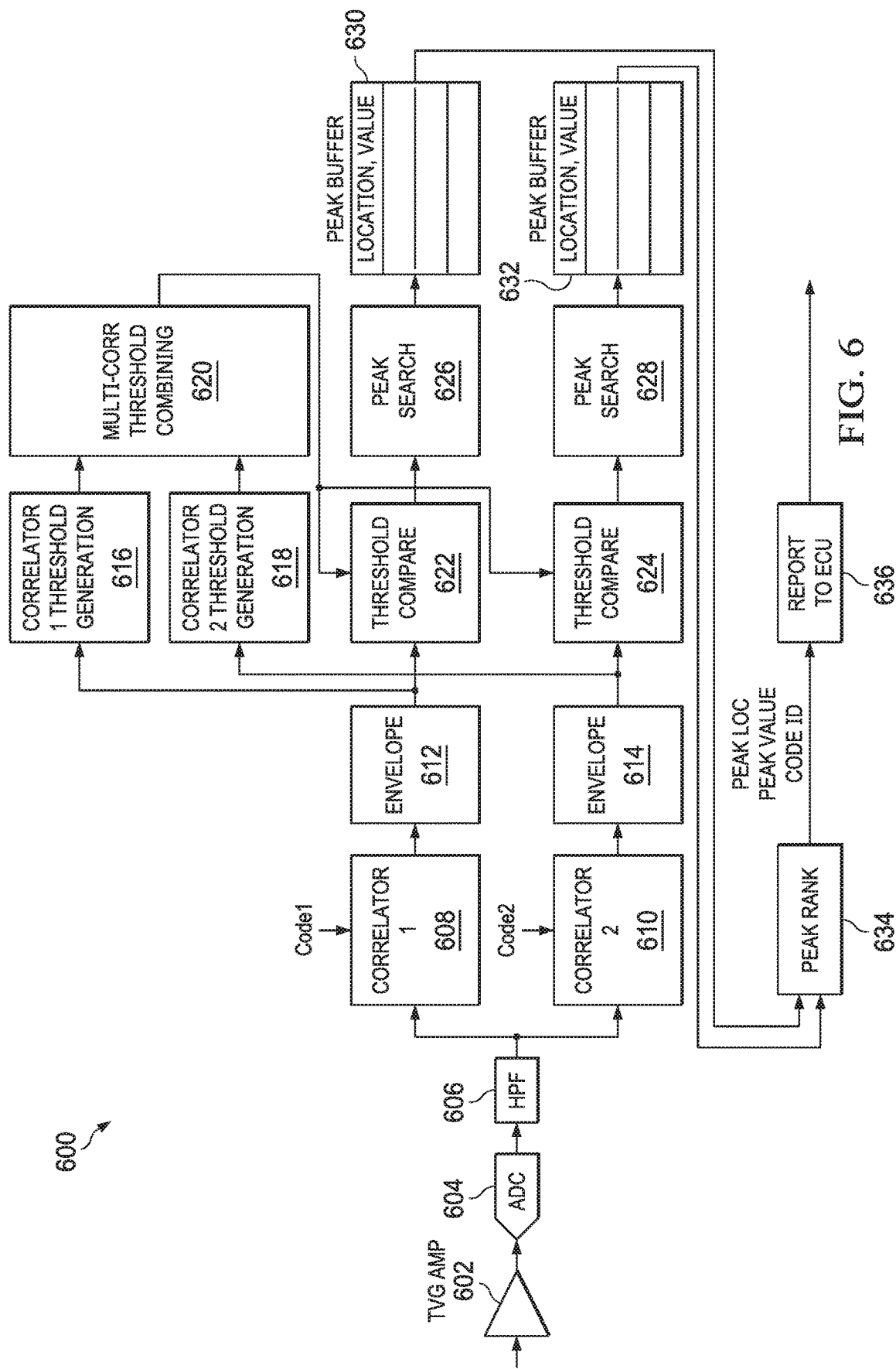
FIG. 6 is a block diagram of an example portion of a received signal processing path in an ultrasonic transducer controller.

FIG. 6 illustrates a portion of a receiver signal processing path 600 capable of dynamic threshold generation. Example receiver signal path 600 is part of a system that employs coded processing to distinguish reflections from two or more coded burst signals, e.g., from two or more different ultrasonic transducers each emitting a burst signature having its own signature frequency-modulation code. These codes are denoted as "Code1" and "Code2" in FIG. 6, which, for the sake of simplicity, shows a two-code example. Other examples can accommodate more codes (e.g., four codes) by implementing additional parallel processing paths between high-pass filter 606 and peak rank stage 634, one such path for each code, and by implementing additional threshold generation stages between respective additional envelope stages and combining stage 620. The example receiver signal path 600 uses multiple correlators 608, 610 and corresponding post-processing for identifying valid peak information and code ID.

A received signal, transduced from an acoustic signal by a transducer (not shown), is amplified by time-varying gain (TVG) amplifier 602, sampled by analog-to-digital converter 604, and filtered by high-pass filter 606. The receiver signal processing path can then split into multiple parallel signal processing paths, which can correspond, for example, to the number of burst codes used by the detection system and therefore to the number of transducers in the system. For simplicity, only two such paths are illustrated in FIG. 6, although receiver signal processing path 600 can have more parallel paths than two, e.g., four parallel paths. Each parallel path can begin with its own correlator 608, 610, each correlator 608, 610 being fed a transmission (TX) template corresponding to a respective burst-code, Code1, Code2. The correlator can function as described previously to provide an output substantially limited to reflections corresponding to bursts coded with the codes of the correlators' respective TX templates. After being processed with a respective correlator 608 or 610, the envelope of the correlated signal is reconstructed with envelope stage 612 or 614.

At correlator 1 threshold generation stage 616, a threshold can be generated based on the first correlator output, and correlator 2 threshold generation stage 618 can similarly generate a threshold based on the second correlator output. These two (or more) dynamic thresholds can then be combined, in multi-correlator threshold combining stage 620, to generate a common threshold to set all the threshold compare stages 622, 624. This common threshold has two components. One is the static definition, as in the example in FIG. 5. The other component is dynamically generated based on the noise level of the received signal. These two components are combined together to generate the combined threshold. As shown in FIG. 6, this combined threshold can be generated for each correlator output, and then the combined threshold generated for the multiple correlator outputs can be combined together again to generate a common threshold that can be applied to each of the correlator outputs.

Multi-correlator threshold combining stage 620 can be configured to combine the different-correlator thresholds in a variety of ways. As one example, multi-correlator threshold combining stage 620 can take the maximum of the correlator 1 generated threshold and the correlator 2 generated threshold. As another example, multi-correlator threshold combining stage 620 can take the minimum of the correlator 1 generated threshold and the correlator 2 generated threshold. As another example, multi-correlator threshold combining stage 620 can just take one input as the output. For example, the threshold from the correlator path corresponding to the code associated with the transducer with which the receiver signal processing path 600 is associated can be used. The combining stage 620 in the transmitter path for any particular transducer may emit a burst coded particularly to that transducer; the receiver path for the same transducer may then pick the correlator threshold that corresponds to the code that is transmitted by the transducer. Thus, for example, if the transducer with which receiver signal processing path 600 is associated emits a Code1 burst, multi-correlator threshold combining stage 620 can simply use the correlator 1 generated threshold as the threshold for all the threshold compare stages 622, 624.

After each respective threshold stage 622, 624, a respective peak search stage 626, 628 performs a peak search to find the locations of peaks in the thresholded envelope waveform. In order to reduce the number of peaks that each signal path processes, the peak search can be subject to a minimum peak distance between the peaks, which distance is provided as an input to each peak search stage 626, 628. This minimum peak distance can be programmatically assigned as a constant or can be dynamically generated according to information about peaks in the envelope of the sampled reflection signal. This minimum peak distance can be set, for example, to be about the width of a main autocorrelation peak. It may be that within this minimum peak distance, one peak cannot practically be separated from another. This peak distance thresholding aspect of peak search stage 630, 632 helps reduce the number of peaks that are processed by each respective signal processing path so that only relevant peaks are retained for processing, e.g., by peak rank stage 634.

Peaks located by peak search stages 626, 628 are written to peak buffers 630, 632, respectively, in each parallel data path. The peak buffers 630, 632 store the location and amplitude of each detected peak. A peak rank stage 634, at which the parallel signal processing paths converge, compares the peaks coming out of the multiple data paths and determines whether a detected echo should be designated a Code1 echo (i.e., a reflection corresponding to a burst coded with Code1) or a Code2 echo (i.e., a reflection correspond to a burst coded with Code2). For any valid peaks detected, peak rank stage 634 can then record the peak location and the amplitude of any peaks along with a code identifier indicative of the code to which such peaks belong. As an example, peak rank stage 634 can be configured to record only peaks having the code with which the overall receiver signal path 600 is associated (by virtue of a receiver being associated with a single transducer). Thus, for example, if receiver signal path 600 is in a controller associated with a transducer that emits Code1-coded bursts, peak rank stage 634 can be configured to record only Code1 peaks. Control inputs to peak rank stage 634 can include a size 2win of a sliding compare window and a mode of operation, designating, for example, whether the peak rank stage 634 should report out only dominant peaks or both dominant and secondary peaks. These control inputs can be provided, for example, by a central controller (e.g., an ECU). The functioning of peak search stages 626, 628 and peak rank stage 634, among other illustrated signal processing states, is the subject of other patent application(s) and detailed description thereof is therefore omitted here. For example, stages other than the threshold generation stages 616, 618, 620 are described in U.S. provisional patent application No. 62/667,802, filed May 7, 2018, which is incorporated herein by reference. The validated peak locations, amplitudes, and code IDs can be reported 636 to a central controller (e.g., ECU) for further processing.

Summarizing the functioning of receiver signal processing path 600, for each correlator 608, 610, time-varying thresholds are generated from static register settings (e.g., 10 time/value pairs) and an estimated noise level in the envelope signal. Time starts counting from the start of an ultrasonic burst or some time defined in relation to said start. Thresholds generated for different correlators at generation stages 616, 618 are combined at multi-correlator threshold combining stage 620 and compared at compare stages 622, 624 with the envelope of each correlator output for detection of qualified echoes in each correlator output. Multi-correlator threshold combining stage 620 can use the maximum of all generated correlator thresholds, or can use the minimum of all generated correlator thresholds, or can select a threshold generated from correlator 1 and use it on all other correlator outputs. All threshold compare stages 622, 624 can use the same time varying thresholds to avoid inconsistency, such as if an autocorrelation peak (Code1 echo/Code1 correlator output) is under the threshold while a cross correlation peak (Code1 echo/Code2 correlator output) is above a different threshold. Such inconsistency would create false echo detection, such as if the cross-correlation peak is declared as valid at peak rank stage 634 instead of the autocorrelation peak.

FIG. 7 illustrates an example threshold generation stage 700 for one correlator, and therefore can correspond to the correlator-specific threshold generation stages 616, 618 of FIG. 6. A static threshold 702, like threshold map 414 of FIG. 4 or 500 of FIG. 5, is fed into a static/dynamic combining stage 706. Static threshold 702 can be programmed through register settings (e.g., for a static threshold map of ten time/value pairs, then time 0 is the start of an ultrasonic burst or some time defined with respect to said start). These time/value pairs can be linearly interpolated to obtain the static threshold at a particular time from time 0 (e.g., the start of the burst).

The envelope coming in from the corresponding correlator path is processed by averaging filter 704, e.g., a narrow-bandwidth low-pass infinite impulse response (IIR) filter that generates the average value of the envelope provided as input to threshold generation stage 700. The computed mean noise value is multiplied by a scaling factor (e.g., a value greater than one), termed Confidence_Factor, to generate the dynamic threshold component, which is a threshold linked to the mean of the noise of the envelope. The threshold after scaling is able to provide a constant false alarm rate. Averaging filter 704 holds its state if the incoming envelope value is above the final correlator threshold, provided via feedback 708, thus avoiding updating the averaging filter with the envelope values of a superthreshold echo. If there is an echo in the envelope signal, it is desirable to avoid integrating the echo in the noise averaging filter. Therefore, when an envelope peak corresponding to an echo that exceeds the combined threshold is observed, averaging filter 704 stops being updated, such that it only averages the noise component of the envelope. In other words, when the echo comes in, if it is above the combined threshold, the updating of averaging filter 704 freezes and the output of averaging filter 704 remains constant until the echo amplitude returns to subthreshold.

Combining stage 706 combines the static and dynamic threshold components (i.e., the threshold map defined by time/value pairs, and the scaled noise average) to generate a combined threshold for the particular correlator with which threshold generation 700 is associated. Combining stage 706 can be configured, for example, to generate a correlator threshold representing the maximum of the static and dynamically generated threshold components, or to generate a correlator threshold representing the sum of the static and dynamically generated threshold components.

FIG. 8 illustrates an example averaging filter 800 that can correspond to averaging filter 704 of FIG. 7. The averaging filter is enableable and disableable by Enable signal illustrated at the bottom of FIG. 8. An input envelope can be decimated, here by M (e.g., M=2), in decimator 802 to produce signal $x(n)$. Delay D is provided to this signal in enableable/disableable storage stage 804, also referred to herein as a delay stage, to delay the decimated input and thereby produce signal $x(n-1)$. If disabled, the delay stage simply holds its state.

Comparator 806 then compares decimated input signal $x(n)$ to delayed decimated input signal $x(n-1)$ to determine whether the input signal is increasing or decreasing, i.e., whether $x(n)$ is larger or smaller than $x(n-1)$. The filter has two coefficients, a rising coefficient for when $x(n)>x(n-1)$ and a falling coefficient for when $x(n){\leq}x(n-1)$. If the input signal is rising, coefficient selector multiplexer 808 chooses a rising coefficient. If the input signal is falling, coefficient selector multiplexer 808 chooses a falling coefficient. A negative feedback loop in the middle of FIG. 7 represents a one-coefficient infinite impulse response (IIR) filter. A feedback signal is subtracted from delayed decimated input signal $x(n-1)$ at adder 810.

The resultant signal is then multiplied by the multiplexer-selected coefficient ("coeff") at multiplier 812, and the feedback signal is then re-added to the coefficient-multiplied signal at adder 816 to produce signal $y(n)$, where $y(n)=y(n-1)+\text{coeff}\times(x(n-1)-y(n-1))$, which is delayed in delay stage 818 to produce the output of the averaging filter 800. Another delay stage 814 delays signal y(n) to provide the feedback signal subtracted at adder 810 and re-added at adder 816. The rising and falling coefficients can, for example, be programmatically selected by a user. For example, the rising coefficient can be $2^{-6}$, and the falling coefficient can be $2^{-8}$. In averaging filter 800, then, the coefficient chosen by multiplexer 808 is adaptable based on whether the sampled input is going up or down.

As indicated by the formula Enable=autoThresholdEnable & [max(x(n−M), . . . x(n+N)) <CorrelatorThreshold], averaging filter 800 is enabled only when an auto-threshold is enabled and when the sample is within a window of width N+M where the maximum value of the signal in the window is less than the combined correlator threshold. The second condition is used to avoid updating the filter when a superthreshold echo exists in the envelope input. Thus, where the current sample is denoted x(n), the enable signal Enable looks ahead for N samples and backward for M samples to see whether there is a sample in this window that is above the current correlator combined threshold (i.e., the output of threshold generation 616 or 618 of FIG. 6 or 700 of FIG. 7). If a sample in the window exceeds the current correlator combined threshold, then the inequality in the enable signal definition at the bottom of FIG. 8 is not satisfied, the Enable signal is set to a disable state, and averaging filter 800 no longer updates. If, on the other hand, no sample in the window exceeds the current correlator combined threshold it is below, then averaging filter 800 will use the incoming envelope signal to update the filter and generate an averaged output. N and M can, for example, be set by a user as programmable parameters.

In some examples, the noise averaging filter 800 can starts with a zero state, i.e., such that delay stage 814 in FIG. 8 is initialized to be zero when the noise averaging filter starts operating. In other examples, delay stage 814 can be configured to begin with the value of the static threshold divided by the value of the Confidence_Factor (of FIG. 7) at the time when auto threshold is enabled. With this initial value set for delay stage 814, the output of delay stage 818 at the start of the auto threshold is equal to the value of the static threshold divided by the value of the Confidence_Factor. After multiplying the output of the noise averaging filter 800 by the Confidence_Factor, such output becomes initially equal to the static threshold. As such, a smooth transition is advantageously achieved between the static threshold and the dynamically generated threshold. In such examples, the illustration of FIG. 7 could further include an input from static threshold 702 into averaging filter 704.

FIGS. 9A and 9B are graphs illustrating an example of the functioning of the threshold generation components, e.g., stages 616, 618, 700, 800 of FIGS. 6-8. The graphs in FIGS. 9A and 9B show an incoming envelope as a solid line and generated thresholds as broken lines. A combined threshold generated by taking a sum of the static threshold component and the dynamically generated threshold component is illustrated as a dashed line. A combined threshold generated by taking the maximum of the static and dynamically generated threshold components at every time point is illustrated as a dotted line. The vertical axis has units of a digital code representing the resolution of the static threshold setting, which in the illustrated example is only 8-bit, thus having a maximum is 255. FIG. 9B shows a zoomed-in portion of FIG. 9A indicated by box 902, i.e., the time from after ten milliseconds and from the amplitude of between zero and ten digital units.

For reasons discussed previously, where the envelope signal is beneath the resolution of the static threshold map defined by, for example, EEPROM-stored time/value pairs, i.e., less than the minimum quantization level of one on the graph, using such a low-resolution static threshold alone provides poor performance, particularly when it needs to be set to higher than the minimum quantization level (e.g., to two, three, four, five, or six) in order to accommodate the variety of noise levels expected to be encountered amongst transducers and their corresponding receivers. However, where, as in the examples of the present description, the threshold used is internally generated, as by the signal processing path 600 shown in the example of FIG. 6, such a threshold can take a value between zero and one, for example, because the dynamically generated threshold is not limited by the resolution (e.g., 8-bit) of the static threshold map.

The generated threshold is effectively adjusted by the envelope shown in FIG. 9A. Seen more clearly in FIG. 9B, a peak 906 corresponding to a reflection from a distant (e.g., six meters distant) target/obstacle appears at around thirty-six to thirty-seven milliseconds. Prior to the ten-millisecond mark, the autoThresholdEnable signal is disabled, meaning that the averaging filter (e.g., 704, 800) is disabled and the combined threshold consists solely of the static threshold component and thus appears as only straight line segments prior to ten milliseconds in FIG. 9A. The auto-threshold is enabled in this example around ten milliseconds. The enable time of the auto-threshold can be set, for example, by a user through programmable register settings. For example, when the static threshold is defined as time/value pairs, a user can select a time point in the static threshold setting as the enable time for the auto threshold. As seen in FIG. 9A and more clearly in FIG. 9B, in a time period between ten and fifteen milliseconds when the static threshold exceeds the dynamically generated threshold component and therefore the maximum of the two is equal to the static threshold, the combined threshold (dotted line) is a straight line 904. When the auto-threshold is enabled at around ten milliseconds, initially the dynamically generated threshold component is still converging, so it is below the static threshold, accounting for linearly interpolated straight line segment 904 in the dotted-line plot of maximum-combiner threshold between about ten milliseconds and about fourteen milliseconds.

At around fourteen milliseconds, when the dynamically generated threshold begins to be greater than the static threshold, the maximum-combiner threshold ceases to be a straight-line plot of 8-bit resolution and becomes the finer resolution threshold signal observed in dotted-line plot. This plot follows the average of the noise, and is multiplied by a scaling factor (e.g., Confidence_Factor of FIG. 7). At around thirty-six milliseconds, the echo 906 is above the combined threshold. Resultantly, the noise averaging filter stops updating in that region, until that threshold falls back below the combined threshold. Around thirty-six milliseconds, both the dashed-line (sum) and dotted-line (max) plots stop updating when the echo 906 is above the threshold and become straight horizontal lines for the time period that the envelope signal (solid line) is above the threshold. This is because the inequality discussed in the Enable formula of FIG. 8 is not met, and the averaging filter (e.g., 704, 800) stops updating. The averaging filter starts updating again when the echo falls below the combined threshold at around thirty-seven milliseconds.

To reiterate with regard to FIG. 8, when the Enable signal is high, the noise averaging filter is continuously updated. That includes when the maximum of the window of the correlated envelope is less than the correlator combined threshold. When the correlator envelope exceeds the threshold, effectively providing an indication of the presence of an echo above the valid threshold, filter 800 stops updating. To reiterate with regard to FIG. 6, in the correlator case, after threshold compare stage 622 or 624, an echo is observed that is above the combined threshold, then that observed echo is fed into the peak search stage 626 or 628 to try to identify the peaks of the echo, and peak rank stage 634 subsequently compares peaks from multiple correlator outputs and determines the code ID of each peak, i.e., whether a peak represents an echo from a Code1-coded burst or an echo from a Code2-coded burst.

Because the echo peak 906 at thirty-six milliseconds exceeds the threshold (under either combiner method), the distant object causing the echo is appropriately detected by the ultrasonic detection system, whereas it would not be if were used a static threshold map set at a terminal level of three or higher, as shown in the example of FIG. 5. The arrangement of the present disclosure thus advantageously is able to detect a distant obstacle that may otherwise go undetected, or would not be detected until a later time when the obstacle came closer to the detection system. As such, the present threshold generation systems and methods can provide more responsive ultrasonic detection.

Figure 10A:
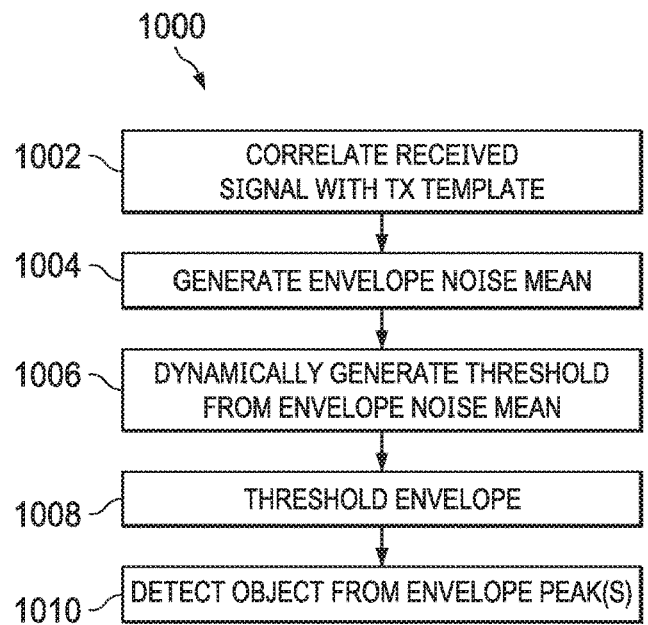
FIGS. 10A-10B are flow diagrams of example methods of ultrasonic detection adaptive thresholding.

FIG. 10A illustrates a method 1000 of ultrasonic detection adaptive thresholding. A received signal, sampled from a transduced reflected acoustic signal, is correlated 1002 with a transmission (TX) template characterizing a frequency-modulation code of a generated burst signal to produce a correlated received signal. A mean of noise in an envelope derived from the correlated received signal is then generated 1004. A threshold based on the envelope noise mean is then dynamically generated 1006. The envelope is then thresholded 1008 based the dynamically generated threshold. The method can also include detecting 1010 an object from the envelope peaks after the dynamic thresholding 1008.

Figure 10B:
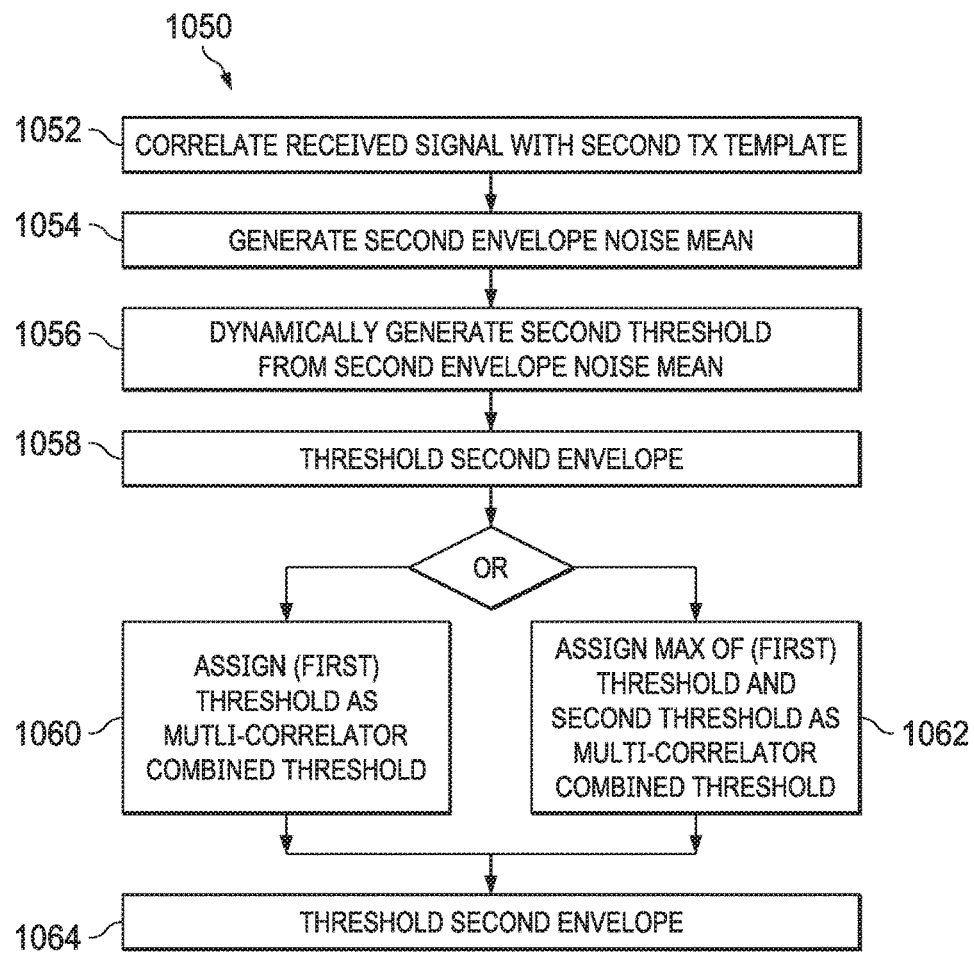

FIG. 10B illustrates a method 1050 of ultrasonic detection adaptive thresholding that can follow from method 1000 of FIG. 10A, although it should be noted that some of the actions of method 1050 can in some examples be performed in parallel with the actions of method 1000 rather than following sequentially thereafter. The received signal is correlated 1052 with a second transmission template characterizing a second frequency-modulation code of a second generated burst signal to produce a second correlated received signal. A second mean of noise in a second envelope derived from the second correlated received signal is generated 1054. A second threshold is dynamically generated 1056 based on the second envelope noise mean. Then, the (first) threshold (i.e., the threshold generated in 1006) is assigned 1060 as a multi-correlator combined threshold, or the maximum of the (first) threshold and the second threshold is assigned 1062 as the multi-correlator combined threshold. The second envelope is then thresholded 1064 based on the multi-correlator combined threshold. The thresholding 1008 of the envelope is also based on the multi-correlator combined threshold. The method can still include detecting 1010 an object from the envelope peaks after the dynamic thresholding 1008, 1064.

Methods 1000, 1050 can be performed, for example, using circuitry or a processor configured in accordance with FIGS. 6, 7, and 8. Not shown, the method(s) can be expanded to include dynamically generating third, fourth, etc., thresholds and using them to threshold third, fourth, etc. envelopes from third, fourth, etc. correlations.

The method(s) 1000, 1050 outlined in FIGS. 10A and 10B can be understood with regard to FIG. 6. As shown in FIG. 6, and particularly with regard to multi-correlator thresholding combining 620, the thresholds from two correlators can be combined first and then applied to both correlator outputs. In other words, the threshold applied to the correlator 1 output can also be affected by the output of the correlator 2 threshold generation 618 in FIG. 6 (depending on the mode of threshold combining).

The systems and methods described herein provide adaptive threshold in the context of an ultrasonic sensing system for target detection. Between the envelope and thresholding stages, threshold generation stages generate a mean of the noise in the envelope from each correlator signal processing path. Receiver signal path 600 has the advantage over receiver signal path 400 that multi-correlator implementation is supported, further improving the responsiveness and robustness of ultrasonic detection by permitting multiple contemporaneous bursts from different transducers without ambiguity upon echo receipt as to which reflections resulted from which bursts (and came from which transducers). In the present systems and methods, the threshold value and time resolutions are not limited by the EEPROM capacity used to store a static threshold map. The present systems and methods can account for noise floor variations due to environment or part variations that cannot be accounted for in static-threshold implementations.

The systems described herein can be implemented, and the methods described herein can be carried out, using an application-specific integrated circuit (ASIC) or multiple ASICs. In some examples, the systems and methods can be implemented or carried out using a general-purpose digital electronic computer programmed to carry out the signal processing involved in the correlator, envelope stage, threshold generation and combining stages, threshold compare stages, peak search stage, peak buffer, and peak rank stage as software instructions.

In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. An ultrasonic sensing system comprising:
   an ultrasonic transmitter configured to transmit a first ultrasonic burst signal representing a first code or a second ultrasonic burst signal representing a second code;
   a sensor having a sensor output and configured to provide a sensor signal at the sensor output responsive to an acoustic signal;
   a correlator having a correlator input and a correlator output, the correlator input coupled to the sensor output, and the correlator configured to provide a correlation result at the correlator output responsive to a correlation between the sensor signal and the first code;
   a threshold generation circuit having a threshold generation input and a threshold generation output, the threshold generation input coupled to the correlator output; and
   a processing circuit having a first processing input, a second processing input, and a processing output, the first processing input coupled to the correlator output, the second processing input coupled to the threshold generation output, and the processing circuit configured to:
   receive a threshold signal at the second processing input;
   perform a comparison between the correlation result and the threshold signal;
   determine whether the acoustic signal is a reflection of the first ultrasonic burst signal or the second ultrasonic burst signal based on the comparison; and
   responsive to determining that the acoustic signal is a reflection of the first ultrasonic burst signal, provide a time-of-flight of the first ultrasonic burst signal based on a time of reception of the acoustic signal.

2. The system of claim 1, wherein the processing circuit is configured to:
   based on a result of the comparison, determine a peak from the correlation result as an echo of the first ultrasonic burst signal; and
   determine the time-of-flight based on a time of reception of the echo.

3. The system of claim 1, wherein the threshold signal varies with time.

4. The system of claim 3, wherein the threshold generation circuit is configured to generate the threshold signal based on performing an average filtering operation on the correlation result.

5. The system of claim 4, wherein the threshold generation circuit is configured to generate the threshold signal based on combining a result of the average filtering operation and a pre-determined signal.

6. The system of claim 5, wherein the threshold generation circuit is configured to:
   receive a current version of the threshold signal;
   receive samples of the correlation result within a window; and
   responsive to samples of the correlation result within the window exceeding the current version of the threshold signal, stop updating the current version of the threshold signal based on the result of the average filtering operation.

7. The system of claim 1, wherein the correlator is a first correlator, the correlator output is a first correlator output, the correlation result is a first correlation result, and the system further comprises a second correlator having a second correlator input and a second correlator output, and the second correlator configured to provide a second correlation result at the second correlator output responsive to a correlation between the sensor signal and the second code; and
   wherein the threshold generation input is a first threshold generation input coupled to the first correlator output, the threshold generation circuit has a second threshold generation input coupled to the second correlator output.

8. The system of claim 7, wherein the threshold generation circuit is configured to:
   generate a first candidate threshold signal based on performing a first average filtering operation on the first correlation result;
   generate a second candidate threshold signal based on performing a second average filtering operation on the second correlation result; and
   generate the threshold signal based on at least one of the first or second candidate threshold signals.

9. The system of claim 8, wherein the threshold generation circuit is configured to generate the threshold signal based on averaging the first and second candidate threshold signals.

10. The system of claim 8, wherein the threshold generation circuit is configured to generate the threshold signal based on:
    selecting one of the first and second candidate threshold signals based on whether an echo of the first or second ultrasonic burst signals is to be detected; and
    providing threshold signal based on the selected one of the first and second candidate threshold signals.

11. A method comprising:
    transmitting a first ultrasonic burst signal representing a first code or a second ultrasonic burst signal representing a second code;
    receiving an acoustic signal;
    converting the acoustic signal to a sensor signal;
    correlating the sensor signal with the first code to generate a correlation result;
    generating a threshold signal based on the correlation result;
    performing a comparison between the correlation result and the threshold signal;
    determining whether the acoustic signal is a reflection of the first ultrasonic burst signal or the second ultrasonic burst signal based on the comparison; and
    responsive to determining that the acoustic signal is a reflection of the first ultrasonic burst signal, provide a time-of-flight of the first ultrasonic burst signal based on a time of reception of the acoustic signal.

12. The method of claim 11, wherein providing a time-of-flight of the first ultrasonic burst signal based on a time of reception of the acoustic signal includes:
    based on a result of the comparison, determining a peak from the correlation result as an echo of the first ultrasonic burst signal; and determining the time-of-flight based on a time of reception of the echo.

13. The method of claim 11, wherein the threshold signal varies with time.

14. The method of claim 11, wherein generating a threshold signal based on the correlation result includes generating the threshold signal based on performing an average filtering operation on the correlation result.

15. The method of claim 14, wherein generating a threshold signal based on the correlation result includes generating the threshold signal based on combining a result of the average filtering operation and a pre-determined signal.

16. The method of claim 15, wherein generating a threshold signal based on the correlation result includes:
receiving a current version of the threshold signal;
receiving samples of the correlation result within a window; and
responsive to the samples of the correlation result within the window exceeding the current version of the threshold signal, stop updating the current version of the threshold signal based on the result of the average filtering operation.

17. The method of claim 16, wherein the correlation result is a first correlation result, and generating a threshold signal based on the correlation result includes:
correlating the sensor signal with the second code to generate a second correlation result;
generating a first candidate threshold signal based on performing a first average filtering operation on the first correlation result;
generating a second candidate threshold signal based on performing a second average filtering operation on the second correlation result; and
generating the threshold signal based on at least one of the first or second candidate threshold signals.

18. An ultrasonic sensing system comprising:
an ultrasonic transmitter configured to transmit a first ultrasonic signal representing a first code or a second ultrasonic signal representing a second code;
a sensor having a sensor output and configured to provide a sensor signal at the sensor output responsive to an acoustic signal;
a processing circuit having a processing input and a processing output, the processing input coupled to the sensor output, and the processing circuit configured to;
perform a correlation between the sensor signal and the first code;
generate a threshold signal based on a result of the correlation;
perform a comparison between the result of the correlation and the threshold signal;
determine whether the acoustic signal is a reflection of the first ultrasonic signal or the second ultrasonic signal based on the comparison; and
responsive to determining that the acoustic signal is a reflection of the first ultrasonic signal, provide a time-of-flight of the first ultrasonic signal based on a time of reception of the acoustic signal.

19. The system of claim 18, wherein the threshold signal varies with time.

20. The system of claim 18, wherein the processing circuit is configured to generate the threshold signal based on performing an average filtering operation on the result of the correlation.

* * * * *